3,793,374
INTERMEDIATES USEFUL IN STEROID TOTAL SYNTHESIS AND PROCESSES THEREFOR
Robert Angelo Micheli, Passaic, N.J., assignor to Hoffmann-La Roche Inc., Nutley, N.J.
No Drawing. Filed Mar. 8, 1971, Ser. No. 122,128
Int. Cl. C07c 49/44
U.S. Cl. 260—586 H       1 Claim

ABSTRACT OF THE DISCLOSURE

A series of novel 5-ketalized-4,5-seco-19-norandrostanes are useful intermediates for the preparation of medicinally valuable 19-norsteroids. These compounds are prepared from 3-ketalized-5-oxo-4,5-seco - 9 - dehydro - 19 - norandrostanes.

BRIEF DESCRIPTION OF THE INVENTION

The present invention relates to compounds of the formula

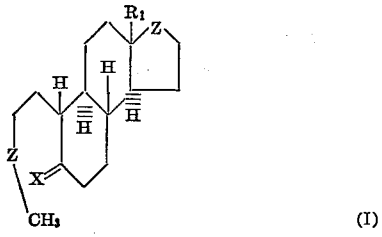

(I)

wherein $R_1$ is a lower alkyl group of from one to five carbon atoms; Z is carbonyl, hydroxymethylene or a group of the formula

where $R_2$ is lower alkanoyl or aroyl; and X represents a conventionally hydrolyzable ketal group, and to methods for the preparation of such compounds from known available starting materials. It should be noted that in any particular embodiment of the above genus, both Z groups are the same, i.e., both are carbonyl, both are hydroxymethylene or both are groups of the formula

where $R_2$ is as above. Compounds of Formula I are valuable new intermediates useful for the synthesis of medicinally important 19-norsteroids.

More particularly, the present invention concerns the preparation of the subgeneric compounds of Formulae Ia, Ib and Ic

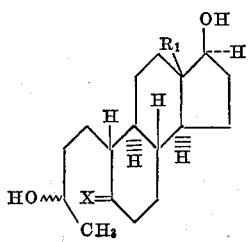

(Ia)

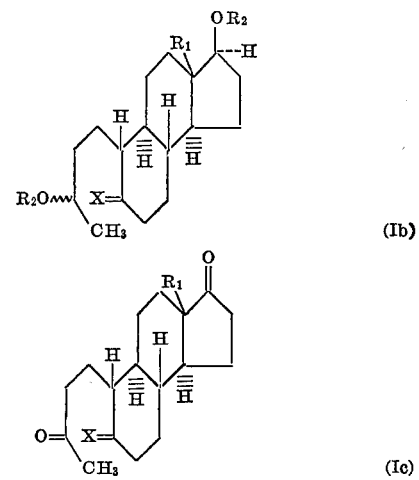

(Ib)

(Ic)

wherein $R_1$, $R_2$ and X are as above.

As used throughout the specification and the appended claims, the term "alkyl group" comprehends a straight or branched chain hydrocarbon group containing no unsaturation and having up to 20 carbon atoms; the term "alkanoyl group" shall mean a group which contains the residue of a saturated aliphatic carboxylic acid containing up to 20 carbon atoms obtained by removing the hydroxyl from the carboxyl moiety. Examples of aliphatic carboxylic acids are formic acid, acetic acid, propionic acid, butyric acid, stearic acid, and so forth. The term "aroyl group" shall mean a group which contains the residue of an aromatic carboxylic acid obtained by removing the hydroxyl from the carboxylic moiety. Aromatic carboxylic acids include phenyl carboxylic acids and naphthyl carboxylic acids which may be substituted in the aromatic ring with lower alkyl, halogen or nitro groups. Examples of aromatic carboxylic acids are benzoic acid, p-toluic acid, naphthoic acid, phthalic acid, p-chlorobenzoic acid, p-nitrobenzoic acid and so forth.

The term "conventionally hydrolyzable ketal group" denotes a group containing valence bonds from two hetero atoms which can be hydrolyzed under acidic conditions to regenerate a carbonyl group. Groups comprehended by the above definition are, for example, di(lower alkoxy) groups wherein the term "alkoxy group" includes substituents containing up to 20 carbon atoms which may be aliphatic, cycloaliphatic, or aralkyphatic in nature such as methoxy, ethoxy, propoxy, butoxy, cyclohexyloxy, benzyloxy and so forth; alkylenedioxy groups containing up to five carbons between the oxygen atoms such as methylenedioxy, ethylenedioxy, 1,2-propylenedioxy, 1,3-propylenedioxy, 2,3-butylenedioxy and so forth; arylenedioxy groups such as 1,2-phenylenedioxy, 1,2-naphthylenedioxy, 2,3-naphthylenedioxy, and so forth; and the above groups where one oxygen is replaced by a sulfur, or by substituted or unsubstituted nitrogen, or where one oxygen is replaced by sulfur and the other oxygen is replaced by substituted or unsubstituted nitrogen, for example, the residues from monothioethyleneglycol, ethanolamine, thioethanolamine, 1,3-propanolamine, 1,3 - thiopropanolamine, cysteine, and so forth.

The term "lower" as applied to any of the foregoing groups denotes a substitutent having a carbon skeleton containing up to and including eight carbon atoms, unless otherwise designated. In the formulae presented herein, the various substituents on cyclic compounds are joined to the nucleus by one of three notations: a solid line (———) indicating a substituent which is in the β-orientation (i.e. above the plane of the paper); a dotted line (- - - - -) indicating a substituent which is in the α-orientation (i.e. below the plane of the paper); or a wavy line (∼) indicating a substituent which is in either the α- or β-orientation. Although the position of the angular substituent at carbon atom 13 of the steroid nucleus has been indicated as the β-orientation, i.e., the "natural" steroid series, the present invention is not to be construed as limited to the "natural" steroid series and is meant to include the corresponding "unnatural" and racemic steroid series.

Preferred compounds of Formula I are those wherein $R_1$ is methyl or ethyl, X is ethylenedioxy, and $R_2$ is acetyl.

Compounds of Formula I can be prepared from known available intermediates by the series of reactions shown in Reaction Scheme I:

dride; and alkoxy substituted complex metal hydrides, e.g., tri-t-butoxy lithium aluminum hydride. The reaction is carried out at a reduced temperature, for example, from about −30 to about +10°. It is especially preferable to conduct the reaction in a temperature range of from about −10° to about +5°. It is generally preferred to use a small molar excess of reducing agent, for example a 10 to 20% molar excess. By conducting the reaction under the above-described conditions, it is possible to selectively reduce the 3-keto group to hydroxyl and to prevent any further reaction of the product thus formed, for example, internal hemiketal formation between the C–3 hydroxyl group and the C–5 ketone.

REACTION SCHEME I

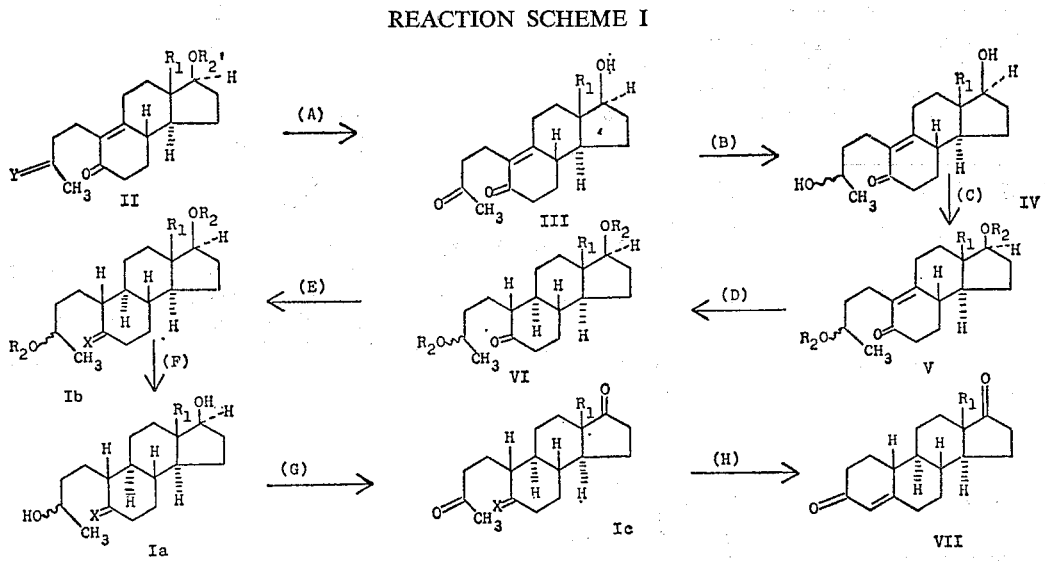

wherein $R_1$, $R_2$ and X are as above; $R_2'$ is a tertiary lower alkyl group; and Y is a ketal protective function selected from the group consisting of di(lower alkoxy), alkylenedioxy and arylenedioxy.

Reaction step A involves the hydrolysis of the ketal group Y and the ether protecting group $R_2'$ from Compound II to afford the hydroxy diketone, Compound III. While groups such as Y and $R_2'$ can generally be removed by aqueous acidic hydrolysis, in this case, by judicious choice of reagents and reaction conditions, cyclization does not occur between carbon atoms 4 and 5 or between carbon atoms 3 and 11 of the diketone product. It has been found that the desired conversion of II to III can be accomplished without effecting the above mentioned unwanted cyclizations, by conducting the reaction at a low temperature, in the anhydrous state, and in the presence of a strong acid. Trifluoroacetic acid is especially preferred. The temperature of the reaction is generally kept between −30 and +5° C., however, a temperature of about 0° C. is especially preferred. Upon the completion of the reaction, the reaction mixture is neutralized in the cold with base so that the acid catalyst is removed before the reaction mixture is allowed to warm up to room temperature for isolation of the product. Thus, by employing special reaction conditions and choice of reagents, it is possible to prepare, in high yields, compounds of Formula III from the correspondng protected compounds of Formula II.

The hydroxy diketone of Formula III is next converted, in reaction step B, to the keto diol of Formula IV by a selective reduction reaction. In this reaction, only the ketone group at carbon atom 3 is reduced, and the ketone at carbon atom 5 is left untouched. The reaction is conveniently effected by treating the hydroxy diketone (III) with a metal hydride reducing agent at a reduced temperature. Metal hydride reducing agents suitable for this conversion are alkali metal borohydrides, e.g. sodium borohydride, lithium borohydride, or potassium borohy- Because of the tendency for internal ketalization of Compound IV, it is generally preferred to immediately convert it to its diester derivative V. This reaction, step C, is carried out in the normal manner for esterification, for example, by reaction with a lower alkanoyl or aroyl halide or anhydride in the presence of a base such as, for example, pyridine. In the present case, it is preferable to carry out the esterification reaction at low temperatures, for example, at about 0°, to minimize formation of dienol ether by cyclization and dehydration between the 3-hydroxyl group and the 5-ketone group.

In reaction step D, the diester V is hydrogenated to afford the compound of Formula VI possessing the desired trans-anti-trans-anti backbone of "natural" steroids. The hydrogenation reaction is carried out in the presence of a metal comprising catalyst, for example, a catalyst containing palladium, platinum, or nickel. A palladium-containing catalyst is preferred. The catalyst may be deposited on an inert support such as, for example, charcoal, barium sulfate, calcium carbonate, and so forth. A palladium-on-charcoal catalyst is especially preferred for this reaction. The hydrogenation can be carried out in any suitable inert organic solvent, such as alcohols, for example, methanol, or ethanol; ethers, for example, tetrahydrofuran or dioxane; esters, for example, ethyl acetate; and so forth. Alcohols such as ethanol are especially preferred. The parameters of temperature and pressure are not narrowly critical for the success of the reaction and can be varied greatly depending upon the choice of catalyst, solvent and substrate. Generally, it is preferred to carry out the hydrogenation at low temperature, for example, from 1 to 5 atmospheres and at a slightly elevated temperature, usually from 50 to 75°. A temperature of about 65° is especially preferred.

The saturated keto diester of Formula VI is converted, in reaction step E, into the compounds of Formula Ib by ketalization of the 5-ketone. The ketalization can be generally accomplished by treating the ketone with a ketalization agent in the presence of a strong acid, with concurrent removal of the water of reaction. Suitable ketalization agents are lower alkanols such as, for example, methanol or ethanol; alkylenediols such as, for example, ethylene glycol, 1,2- or 1,3-propylene glycol or 2,3-butanediol; arylenediols such as, for example, catechol, 1,2-naphthylenediol, 2,3-naphthylenediol, and so forth; monothiokanolamines such as, for example, ethanolamine; alkanol exchange reagents such as, for example, 2,2-dimethoxypropane; and alkylenedioxy exchange reagents such as, for example, 2,2-dimethyl-1,3-dioxolane. Preferred ketalization agents are alkylenediols. Ethylene glycol is especially preferred.

Suitable acid catalysts include, mineral acids, for example, sulfuric acid, hydrochloric acid or perchloric acid; organic sulfonic acids, for example, p-toluenesulfonic acid, and Lewis acids, for example, boron trifluoride. The ketalization reaction is generally conducted under conditions well known to one skilled in the art. For example, the reaction can be conducted in an inert organic solvent from about room temperature to the boiling point of the solvent medium, and the water of reaction can be removed either by azeotropic distillation or by reaction with a dehydrating agent present in the reaction mixture. Examples of suitable dehydrating agents are, for example, trialkyl orthoformates, alkanol exchange reagents, alkylenedioxy exchange reagents, molecular sieves and so forth.

In reaction step F, the ketal diester of Formula Ib is converted to the ketal diol of Formula Ia. This conversion can be accomplished in a number of ways including, for example, saponification of the ester group by reaction with a strong base such as an alkali metal hydroxide or alkali metal carbonate. This saponification reaction is conveniently carried out at about room temperature in a suitable solvent such as, for example, a lower alkanol or an aqueous lower alkanol. Alternatively, the ester groups can be removed by reduction with a complex metal hydride reducing agent such as, for example, lithium aluminum hydride, in an inert organic solvent, preferably an ether.

The ketal diol of Formula Ia is converted, in reaction step G, to the ketal diketone of Formula Ic by treatment with an oxidizing agent. Suitable oxidizing agents include, for example, chromium trioxide, and potassium permanganate. It is preferred to use a chromium trioxide-containing agent such as, for example, Jones reagent, chromium trioxide-pyridine, chromium trioxide-dimethylformamide, and so forth. It is especially preferred to utilize Jones reagent. The oxidation is accomplished using two equivalents of the oxidizing agent to effect the oxidation of both hydroxyl groups to ketone. Oxidation with Jones reagent is conveniently carried out at a reduced temperature, for example, about 0 to +5°, and care is taken to control the reaction medium by slow addition of the Jones reagent so that the protective ketal group is not unnecessarily removed.

The compounds of Formula Ic are especially useful as they can be easily converted into 19-norandrostenediones of Formula VII which are valuable 19-norsteroid intermediates useful in the synthesis of medicinally important steroids, for example, 17α-ethynyl-19-nortestosterone and 17α-ethynyl-18-methyl-19-nortestosterone. The conversion of Compound Ic to steroid VII, reaction step H, involves the removal of the ketal protective group X followed by the cyclization of the A-ring of the liberated 5-ketone. This reaction is conveniently effected by treating Compound Ic with a strong acid. Suitable acids are, for example, mineral acids such as sulfuric acid or hydrochloric acid, and organic sulfonic acids such as p-toluenesulfonic acid. The reaction can be carried out in any inert solvent medium. Preferred solvents include lower alkanols such as, for example, methanol and ethanol and mixtures of the above with water. The temperature of the reaction is not critical and can vary from about room temperature to about the boiling point of the reaction medium. In general, it is preferred to carry out this reaction in refluxing aqueous methanol or aqueous ethanol.

The following examples should better serve to illustrate the practice of the present invention. All temperatures are expressed in degrees centigrade.

EXAMPLE 1

20 ml. of trifluoroacetic acid was chilled to 0° and 5.0 g. of 3,3 - ethylenedioxy-17β-tert.butoxy-4,5-seco-19-norandrost-9-en-5-one was added. The solution was stirred two hours at 0° and 250 ml. of 10% $Na_2CO_3$ was added. The mixture was extracted with methylene chloride which was in turn washed with water and dried. After removal of the solvent, the residue was dissolved in methanol and treated with 10% sodium carbonate solution overnight at room temperature. The product was isolated in the usual manner and purified on a column of silica gel. Crystallization from ether afforded 17β-hydroxy-4,5-seco-19-norandrost-9-en-3,5-dione, M.P. 94–6°, $[\alpha]_D^{25}$ —43.6° ($CHCl_3$, c.=1.0%);

$$\lambda_{max.}^{EtOH} 247/8 \ (\epsilon\ 15{,}100)$$

EXAMPLE 2

0.5 g. of hydroxy diketone prepared as in Example 1 was dissolved in 5 ml. of ethanol, cooled to —10° and treated with 18.7 mg. of sodium borohydride. The temperature was kept between —10° and +5° for two hours at which time the crude 4,5-seco-19-norandrost-9-en-3,17β-diol-5-one was isolated. This material was dissolved in 6 ml. of pyridine and treated with 6 ml. of acetic anhydride for two hours at ice-bath temperature and then allowed to stand overnight at room temperature. Normal work-up followed by chromatography on silica gel afforded 4,5-seco-19-norandrost-9-en-3,17β-diol-5-one diacetate as a yellow oil, $[\alpha]_D^{25}$ —29.0° ($CHCl_3$, c.=1.0);

$$\lambda_{max.}^{EtOH} 247/8 \ (\epsilon\ 14{,}580)$$

EXAMPLE 3

1.40 g. of diacetate prepared as in Example 2 was dissolved in 28 ml. of 95% ethanol and was hydrogenated over 0.14 g. of 5% palladium-on-charcoal catalyst at 65°. After removal of the catalyst and evaporation of the solvent, there was obtained 4,5-seco-19-norandrostan-3,17β-diol-5-one diacetate.

EXAMPLE 4

The hydrogenation product prepared as in the previous example (1.36 g.) and 11.5 ml. of methylene chloride was allowed to react with 1.87 ml. of ethylene glycol, 1.87 ml. of triethylorthoformate and 0.137 ml. of conc. sulfuric acid for 1.5 hours at room temperature. The mixture was diluted with 55 ml. of methylene chloride, washed with 11 ml. of 10% sodium carbonate, with brine and dried over sodium sulfate. Removal of the solvent under reduced pressure at 50° gave 1.57 g. of a yellow oil. Chromatography on silica gel (31.4 g.) and elution with benzene-petroleum ether, benzene, and benzene-ether gave (from the 2% and 4% ether in benzene fractions) 0.59 g. of 5,5 - ethylenedioxy - 4,5-seco-19-norandrostan-3,17β-diol diacetate as a yellow oil, $[\alpha]_D^{25}$ +6.5° ($CHCl_3$, c.=1.0%); IR (3%, $CS_2$) 1738 and 1250 cm.$^{-1}$ (OAc); NMR ($CDCl_3$) δ 0.82 (C–18), 1.18 (d., J=6.5 Hz.) (C–4); 1.98 (d, 2.02 Hz.) (2Ac), 3.95 (ethylenedioxy).

EXAMPLE 5

810 mg. of ketal diacetate prepared as in Example 4, 8.1 ml. of methanol and 2.0 ml. of 5 N sodium hydroxide was refluxed under nitrogen for one hour. After removal of the methanol under reduced pressure at 50°, benzene was added and the organic layer was washed with saturated salt solution, dried over sodium sulfate and the solvent was removed under reduced pressure. The crude material (560 mg. of a foam) was further purified by dissolving it in hot ether, concentrating the solution to about 3 ml., chilling in an ice-bath and decanting the solvent from the white solid. This was repeated three times and the white solid, 5,5-ethylenedioxy-4,5-seco-19-norandrostan-3,17β-diol, was collected and dried in vacuo for one hour at 45°, 304 mg.; $[\alpha]_D^{25}$ +13.7° (CHCl$_3$, c.=1.0%); IR (3%, CHCl$_3$) 3650 cm.$^{-1}$ (OH); NMR (CDCl$_3$) δ 0.77 (C-18), 1.17 (d., J=6 Hz. C-4), 2.20 (20H), and 3.98 (ethylenedioxy).

EXAMPLE 6

1.32 g. of ketal diol prepared as described in Example 5 was dissolved in 13.2 ml. of acetone and the solution was chilled to −5° in an ice-salt bath. 2.0 ml. of Jones reagent was slowly added, and the mixture was stirred for another 10 minutes at the same temperature. Water (70 ml.) was added and the solution was adjusted to pH 6 with sodium acetate. The crude product was extracted with methylene chloride and the organic extract was washed with water and dried over sodium sulfate. Removal of the solvent gave 1.23 g. of a yellow oil. A 0.60 g. portion of this material was chromatographed on 30 g. of silica gel and eluted with benzene and benzene-ether. The main fractions, 0.39 g., were rechromatographed on 1.95 g. of silica gel. Elution with petroleum ether-benzene, benzene and benzene-ether gave 0.278 g. of 5,5-ethylenedioxy-4,5-seco-19-norandrostan-3,17-dione, $[\alpha]_D^{25}$ +74.0° (CHCl$_3$, c.=1.0%); IR (3%, CHCl$_3$) 1738, 1712 cm.$^{-1}$; NMR (CDCl$_3$) δ 0.89 (C-18), 2.10 (C-4) and 3.95 (ethylenedioxy).

EXAMPLE 7

A 0.24 g. sample of ketal diketone prepared as in Example 6 in 3 ml. of 95% ethanol and 1 ml. of 6 N HCl was refluxed 1.5 hours under nitrogen. The solution was chilled in an ice-bath and adjusted to pH 7 with 4.5 ml. of 10% sodium carbonate. Most of the solvent was removed in vacuo at 50° and the residue was extracted with 15 ml. of benzene. The organic layer was washed with saturated salt solution, dried over sodium sulfate and the solvent was removed in vacuo at 50° to afford 0.17 g. of 19-norandrost-4-en-3,17-dione, $[\alpha]_D^{25}$ +118.5° (CHCH$_3$, c.=1.0%). Crystallization from methylene chloride-ether afforded 0.051 g., M.P. 167–169.5°; $[\alpha]_D^{25}$ +140.2° (CHCl$_3$, c.=1.0%); UV $\lambda_{max.}^{EtOH}$ 240 mμ (ε 17,400)

IR (3%, CHCl$_3$) 1740, 1670 and 1612 cm.$^{-1}$.

What is claimed is:

1. A process for hydrolyzing the R$_2'$ and Y protective groups of a compound of the formula

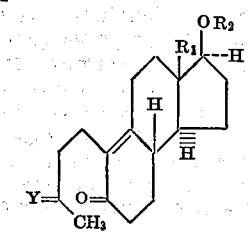

(II)

wherein R$_1$ is a lower alkyl group of from one to five carbon atoms; R$_2'$ is a tertiary lower alkyl group and Y is a ketal protective function selected from the group consisting of di(lower alkoxy), alkylenedioxy and arylenedioxy to afford a compound of the formula

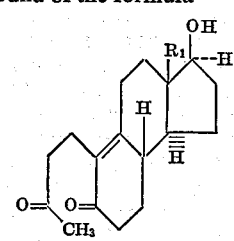

(III)

wherein R$_1$ is as above
which comprises the step of treating the former compound with anhydrous trifluoroacetic acid at a temperature between −28 and +10°.

References Cited
UNITED STATES PATENTS 3,544,598  12/1970  Saucy _____ 260—340.9
3,544,600  12/1970  Rosenberger et al. __ 260—586 H DONALD G. DAUS, Primary Examiner J. H. TURNIPSEED, Assistant Examiner U.S. Cl. X.R.

260—340.9, 397.3, 476 C, 488 B

UNITED STATES PATENT OFFICE
CERTIFICATE OF CORRECTION

Patent No. 3,793,374            Dated February 19, 1974

Inventor(s) Robert Angelo Micheli

It is certified that error appears in the above-identified patent and that said Letters Patent are hereby corrected as shown below:

Column 8, line 33, "-28" should be "-20"

Signed and sealed this 29th day of October 1974.

(SEAL)
Attest:

McCOY M. GIBSON JR.  
Attesting Officer

C. MARSHALL DANN  
Commissioner of Patents